United States Patent [19]
Avocat

[11] Patent Number: 4,466,047
[45] Date of Patent: Aug. 14, 1984

[54] CAPACITOR FOR MEDIUM-RANGE VOLTAGE CAPACITIVE DIVIDERS

[76] Inventor: Jean P. Avocat, 4, rue Philippe Lebon, 59500 Lambres Lez Douai, France

[21] Appl. No.: 290,431

[22] Filed: Aug. 6, 1981

[51] Int. Cl.³ ............................................. H01G 1/005
[52] U.S. Cl. ..................................... 361/303; 361/323
[58] Field of Search ............... 361/271, 272, 301, 303, 361/311, 275, 304, 323

[56] References Cited

U.S. PATENT DOCUMENTS 1,708,490  4/1929  Webster ............................ 361/271
2,559,141  7/1951  Williams ........................... 361/271

FOREIGN PATENT DOCUMENTS 46004  9/1962  Poland ................................. 361/323

Primary Examiner—Roy N. Envall, Jr.
Assistant Examiner—Alfred S. Keve
Attorney, Agent, or Firm—Harding, Earley, Follmer & Frailey

[57] ABSTRACT

A capacitor for use in a medium voltage capacitive voltage divider according to the present invention includes spaced plates encapsulated within an insulating material, the resulting device being usable as a supporting insulator as well as a voltage divider. The plates are configured such that there are no sharp corners or protuberances exposed therebetween, thus minimizing arcing propensity. The capacitor includes a first disc-shaped plate supported by a coaxial rod connected to a corresponding terminal. Dielectric material is cast around the first plate and a second plate is disposed over the exterior surface of the cast dielectric material. An exterior insulating material is encapsulated around the second plate which is electrically connected to a second terminal.

18 Claims, 14 Drawing Figures

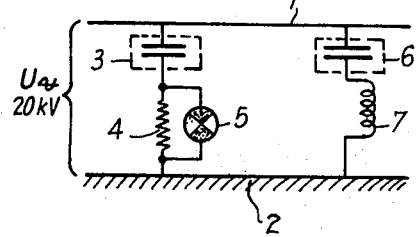
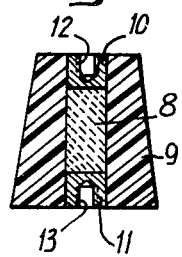
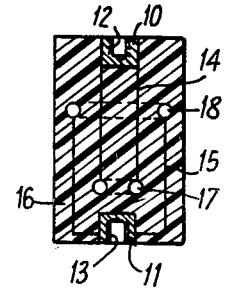
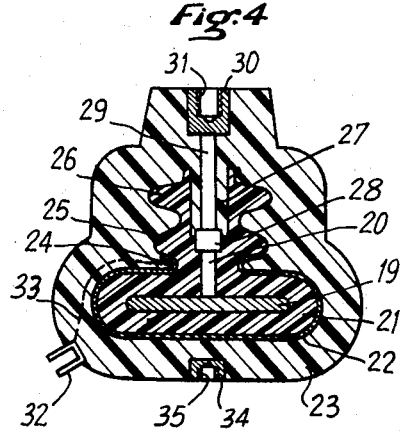
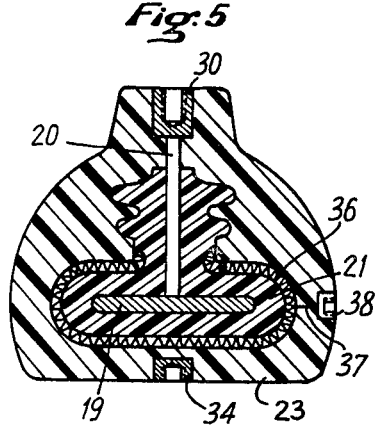
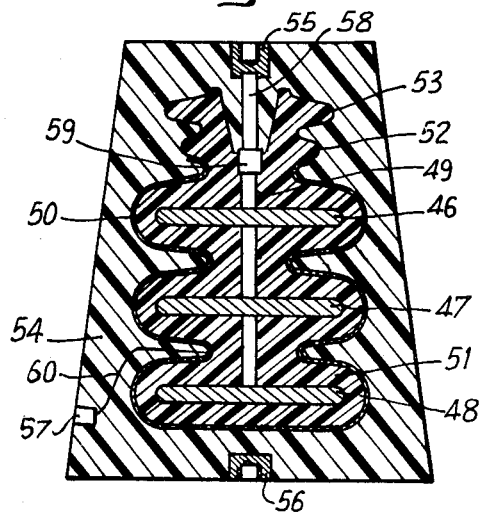

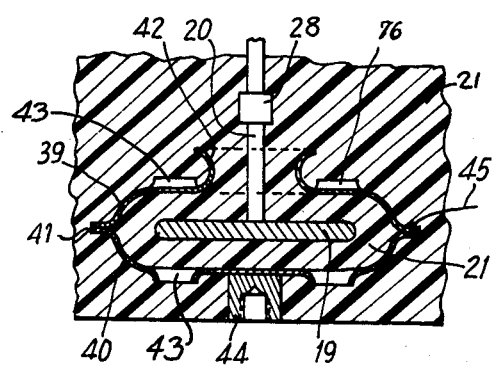
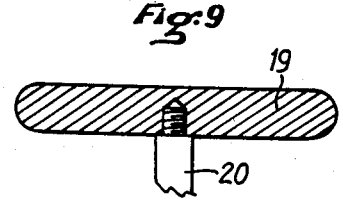
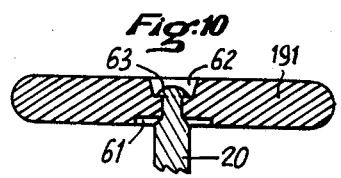
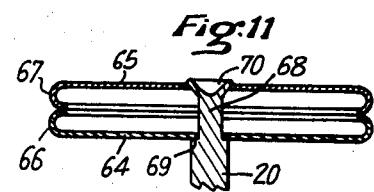
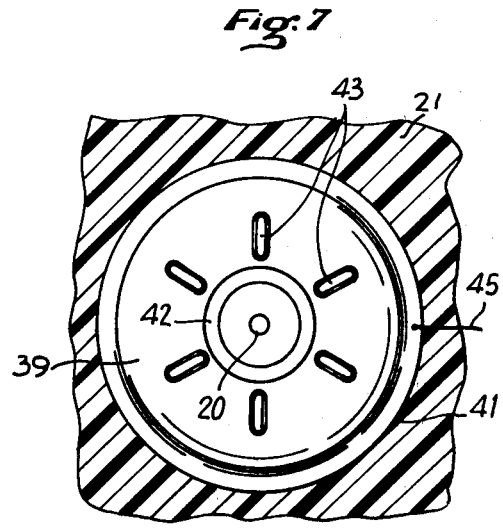
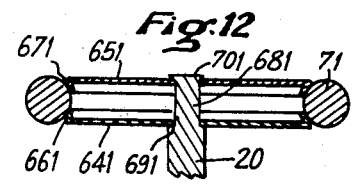
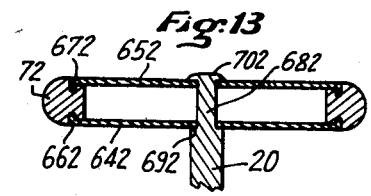
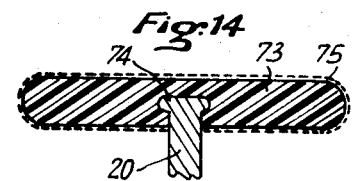

CAPACITOR FOR MEDIUM-RANGE VOLTAGE CAPACITIVE DIVIDERS

FIELD OF THE INVENTION

The present invention relates to capacitors, and more particularly to capacitors for medium voltage capacitive voltage dividers, often referred to as capacitive dividers, for use in medium voltage systems.

BACKGROUND OF THE INVENTION

It is usually desirable to include in medium voltage electrical networks devices for detecting the magnitude or presence of voltages on the network, lines or cables. Such a device could either simply indicate the presence of a voltage or it could provide a signal to a remote indication, control or protection device or both. One such type device used to accomplish these functions is a medium voltage capacitive voltage divider which is electrically connected in series with a low voltage impedance combining, for example, a resistor, capacitor, light bulb, relay or transformer windings, or any combination thereof; and which series combination is electrically connected between one of the medium voltage network phases and ground.

Medium voltage capacitors commonly include a ceramic dielectric member having a high specific inducting power, which is encapsulated within a mass of insulating, thermal hardenable resin which in turn forms another element of a medium voltage system such as, for example, a supporting insulator, a current transformer, a passage insulator, etc. A known technique is schematically shown in FIG. 1, where a bus 1 for distributing electrical power at medium voltages, for example 20 KV, is spaced from ground 2 by a supporting insulator which includes a capacitor 3 having a very high capacity which is able to withstand the voltage applied to the bus 1. A resistance 4 is electrically connected in parallel with a signaling indicator 5, this parallel combination being electrically connected in series with the capacitor 3. Similarly, another example of a supporting insulator includes a capacitor 6, placed in series with a winding 7 of a relay or a transformer.

FIG. 2 depicts one type of a medium voltage capacitor, usable as capacitor 3 or 6 in the circuit shown in FIG. 1, which comprises a ceramic dielectric member 8 which is characterized by a very high specific inducting power. The ceramic member 8 is cast within a mass of insulating, thermal hardenable resin 9, which forms the mechanical element for the particular electrical device contemplated, namely a support, current transformer, passage insulator, etc. The member 8 is located between two inserted elements 10 and 11 which are cast in the resin 9. The inserted elements 10 and 11 are electrically conductive, preferably made of metal, and include threads 12 and 13. These inserted elements serve not only as supports but also as terminals and as plates of the capacitor.

In FIG. 3 there is shown another embodiment of a medium voltage capacitor wherein the ceramic element 8 is replaced by two cylindrical electrodes 14 and 15 which are formed from metal sheets or screens and which are maintained at a predetermined distance from each other during the casting of the resin mass 16. The electrode 14 is connected to an inserted element 10 having internal threads 12 while the electrode 15 is connected to an inserted element 11 having internal threads 13.

Both of the prior art embodiments shown in FIGS. 2 and 3 have the disadvantage of developing very high electrical stresses in certain regions of the cast mass as well as very high mechanical stresses due to the differing coefficients of expansion of the elements forming the device. In the case of the embodiment set forth in FIG. 3, the high electric stresses are reduced by means of rings 17 and 18 whose curvatures are calculated in a well known manner in order to achieve acceptable stresses in zones exposed to peak effects. Nevertheless, the problem exists of maintaining the desired relative positions of the two electrodes 14 and 15 in order to insure that they are perfectly concentric. Since this effect is rather difficult to achieve, the known capacitor shown in FIG. 3 has relatively poor reliability.

The object of the present invention is to remedy the foregoing difficulties and provide new and improved capacitive voltage dividers which are more dependable than heretofore, less susceptible to high voltage breakdown due to arc-over and less cumbersome, and which are adapted for manufacture economically in large volume.

SUMMARY OF THE INVENTION

The novel capacitor of the present invention comprises a first or inner plate in the form of a thick, generally flat disc with rounded edges having a radius of curvature which is everywhere greater than that which would result in a dangerous dielectric overload for the surrounding insulating material and which is compatible with the allowable electrical gradient of that material. The first plate is supported by a cylindrical coaxial conducting rod connected to a terminal corresponding to the first plate. A mass of solid dielectric material is cast around the first plate and around at least that portion of the supporting rod which is connected to the first plate. All points on the external surface of the dielectric material are located at approximately the same distance from the first plate and its supporting rod up to approximately the middle of the rod where the dielectric material forms a neck having at least one rounded lobe surrounding the supporting rod. Each rounded lobe has a radius of curvature larger than one which could provoke a dangerous dielectric overloading of the insulation. A second or outer plate comprises a conducting layer covering the external surface of the dielectric material but does not cover the collar. The conducting layer covers the external surface of the dielectric material up to a first groove at the beginning of the convex area of the first lobe of the neck thereby forming an electric field deflector. The second plate is electrically connected by a wire conductor to a second terminal corresponding to the second plate. A solid exterior insulating mass of synthetic or elastomeric resin is cast around the dielectric material and the second plate, leaving exposed the first terminal, the second terminal and an axial support member, which support member is disposed in opposed, axially spaced relation to the first terminal.

BRIEF DESCRIPTION OF THE DRAWINGS

FIG. 1 is a schemtaic diagram showing the disposition of capacitive voltage dividers between a voltage line and ground.

FIG. 2 is a vertical cross-sectional view of a prior art capacitor.

FIG. 3 is a vertical cross-sectional view of another prior capacitor.

FIG. 4 is a vertical cross-sectional view of a preferred embodiment of a capacitor for a capacitive voltage divider in accordance with the present invention.

FIG. 5 is a vertical cross-sectional view of another embodiment of a capacitor in accordance with the present invention.

FIG. 6 is a vertical cross-sectional view of yet another embodiment of a capacitor in accordance with the present invention.

FIG. 7 is a partial cross-sectional view in plan of the embodiment shown in FIG. 6 illustrating the outer plate.

FIG. 8 is a vertical cross-sectional view of a further embodiment of a capacitor in accordance with the present invention.

FIGS. 9 through 14 are partial vertical cross-sectional views showing details of various disc-shaped plates of capacitors in accordance with the present invention.

DETAILED DESCRIPTION OF THE PREFERRED EMBODIMENTS

Referring to FIG. 4, there is shown a capacitor for a capacitive divider in accordance with the present invention comprising a first plate 19, supported by a coaxial rod 20, with a solid mass of dielectric material 21 cast around the plate 19 and rod 20. The capacitor also includes a second plate 22 covered or encapsulated by an exterior mass of insulating material 23.

The first plate 19 comprises a thick, generally flat disc having rounded edges. The second plate 22 surrounds and is spaced from the first plate 19 to form a space filled by the mass of dielectric material 21, which is cast around the first plate 19 and the root of the supporting rod 20. The external surface of the mass of dielectric material 21 is substantially equidistant at all points from the first plate 19 and the supporting rod 20. The second plate 22 extends upwardly to the position designated by reference numeral 24 where it forms a rounded collar having a radius of curvature which maintains the electrical gradient inside the dielectric material 21 at an acceptable level. The upper end of the second plate 22 at collar 24 has a relatively sharp edge, which is turned outwardly and covered by a first rounded lobe 25 formed by a continuation of the mass of dielectric material 21.

Above lobe 25 there is provided a second rounded lobe 26 formed by a continuation of the dielectric material 21. The upper end of the mass of dielectric material 21 is cast with a recess 27 at the bottom of which is embedded a nut 28 which is threadedly connected to the top of the coaxial supporting rod 20. A second coaxial rod 29 is threadedly connected to the nut 28. At the upper end of the second coaxial rod 29 is an integral terminal 30 having an internal thread 31. The terminal 30 is substantially coaxial with the central axis of the capacitor shown in FIG. 4. The upper terminal 30 is the electrical terminal corresponding to the first plate 19.

The second plate 22 is electrically connected to an exterior terminal 32 on the side of the capacitor by a wire 33 which is wound tightly around the collar 24 in order to achieve an appropriate contact. An inserted member 34, having an internal thread 35, is molded in the exterior of the insulating mass 23, and is substantially coaxial with the supporting rods 20 and 29 as well as with the terminal 30. The member 34 is completely insulated from other elements of the capacitor.

As previously stated, the first plate 19 has the shape of a circular disc and the supporting rods 20 and 29 are cylindrical as are the inserted parts 30 and 34. Both plates 19 and 39, 40 may be formed of aluminum. The second plate 22 has a flattened round shape as do the lobes 25 and 26. Consequently, the capacitor of the present invention is substantially symmetrical about its central axis, and the first terminal 30, supporting rods 20 and 29 and supporting member 34 are substantially coaxial with the central axis.

The insulating masses 21 and 23 preferably are epoxy resin and the first plate 19, the supporting rods 20 and 29, the nut 28, the first terminal 30 and the supporting member 34 are preferably aluminum or an aluminum base alloy since aluminum and the epoxy resin have coefficients of expansion which are substantially equivalent. Consequently, mechanical stresses caused by temperature variations are small—a feature which is important during casting.

There are various ways of making the second plate 22. As shown in FIG. 4, the second plate 22 may be formed by depositing a conductive layer, for example metal, such as aluminum, or a conducting carbon base paint, on the exterior surface of the dielectric material 21. The application of the conductive layer can be performed by different techniques such as spraying, soaking, vacuum metallization, electroplating, etc.

FIG. 5 shows another embodiment of the second plate 22 wherein the dielectric material 21 is overcast by a relatively thick layer of a semi-conductive material 36 into which is embedded a conducting wire 37 which in turn is electrically connected to a second terminal 38.

Yet another embodiment of the second plate 22 is shown in FIGS. 6 and 7 wherein the second plate comprises a pair of opposing metallic cup-shaped members 39 and 40 having the same diameter. The cup-shaped members 39 and 40 are connected to each other at their outer edges 41 by welding, riveting or the like, and thereby form an enclosure surrounding the first plate 19 and the dielectric material 21. To facilitate penetration of the latter, the upper cup-shaped member 39 includes a hollow collar portion 42, which surrounds the supporting rod 20, and angularly spaced median openings 43 are formed in the cup-shaped members 39 and 40. The edges 76 of openings 43 are bent externally, the bends having a sufficient radius of convex curvature relative to the inner plate 19 such that dielectric overloads in the insulating material 21 are avoided. In fabricating the embodiment shown in FIGS. 6 and 7, the upper and lower cup-shaped members 39 and 40 are supported during the casting process by clamps (not shown), or by at least one axial support member 44 similar to the axial support member 34 of the embodiments shown in FIGS. 4 and 5. The support member 44 conveniently maintains the second plate formed by cup-shaped members 39 and 40 at a predetermined position with respect to the first or inner plate 19 during the casting of the insulating dielectric material 21. A conducting wire 45 electrically connects the second or outer plate 39, 40 to an exterior terminal (not shown). In FIG. 6 and 7, the insulation material 21 between the two plates 19 and 39, 40 is the same as that surrounding the outer plate 39, 40.

In FIG. 8 there is shown another embodiment of the capacitor of the present invention having an increased capacity over those embodiments depicted in FIGS. 4 through 7. This increased capacity is achieved by providing a first plate comprising discs 46, 47 and 48 which are spaced substantially uniformly on the same supporting rod 49. A second plate 50 is maintained at the desired uniform distance with respect to the first plate discs 46, 47, 48 and supporting rod 49 by means of a mass of dielectric material 50. The dielectric material 51 is cast in a form which includes a first lobe 52 and a second lobe 53 at the upper end thereof. The entire assembly is overcast by an encapsulating mass of insulating material 54 into which there are embedded a first terminal 55, an axial supporting member 56 and a second terminal 57. The first terminal 55 is connected to the supporting rod 49 by a rod 58 and a nut 59. The terminal 57 is electrically connected to the second plate 50 by means of a conducting wire 60. The embedded axial supporting member 56 is totally insulated from the other elements of the capacitor by the insulating material 54.

In the embodiment illustrated in FIGS. 4 through 8, the metallic parts preferably are formed of a metal whose expansion coefficient is substantially equal to the expansion coefficient of the insulating materials. For example, where the insulating or dielectric materials are epoxy resin, the metallic parts such as the plates, supporting rods, nuts, terminals and supporting members may be aluminum, since aluminum and epoxy resin have coefficients of expansion which are substantially equivalent.

Techniques for manufacturing the embodiments shown in FIGS. 4 through 8 are well known. The cup-shaped members 39 and 40 can be formed by pressing or stamping sheet metal. Other parts of the capacitor of the present invention are made by usual plastic material casting methods or by general casting techniques. The superior qualities of the capacitors of the present invention depend, in large part, upon maintaining the two plates of the capacitor in correct relative position with respect to each other. It is essential that the spacing between the first (inner) and second (outer) plates be rigidly uniform. The symmetrical shape of the capacitor and its parts about the central axis of the device facilitates location of the component parts at their correct distances relative to each other.

FIGS. 9 through 14 show different ways of fabricating the first plate 19 of the capacitor of the present invention. FIG. 9 shows one embodiment wherein a solid aluminum disc 19 is either riveted or screwed to the end of the supporting rod 20. In FIG. 10, there is shown a section of a semiconducting elastomeric disc 191 connected to the end of the supporting rod 20. The disc 191 is reinforced at the location of contact with the supporting rod 20 by a washer 61 which rests on a shoulder of the supporting rod 20. A recess 62 is provided on the other side of the disc which receives the head 63 of a rivet formed at the end of the supporting rod 20.

In FIG. 11, there are shown two identical metallic cup-shaped members 64 and 65, formed by pressing or stamping, with their exterior edges bent inwardly into contact with each other. The end of the supporting rod 20 includes a smaller diameter portion 68 which forms a shoulder 69 upon which rests the rim of a central hole in the lower cup-shaped member 64. A similar hole is provided in the upper cup-shaped member 65 on the rim of which rests a rivet 70 provided at the end of the rod portion 68.

FIG. 12 depicts a configuration similar to that of FIG. 11 with two cup-shaped members 641 and 651 having their edges 671 and 661 oriented toward each other, but having the rims thereof spaced from each other by a ring 71 made of a semiconducting elastomeric material and having a smooth, circular profile protruding from the periphery. Member 641 rests on shoulder 691, and the head of rivet 701 engages member 651.

In FIG. 13 there is shown another embodiment similar to the embodiment shown in FIG. 12, the main difference being that the turned edges 662 and 672 are parallel to the axis of the supporting rod 20 and are embedded in a ring 72 of a semiconducting elastomeric material which has a smooth, arcuate exterior profile.

FIG. 14 depicts a disc 73 made of a cast insulating material which is securely attached to the end of a supporting rod 20 having a head 74 formed thereon. The insulating disc 73 is externally metallized by a conducting layer 75, which is electrically connected to the axial supporting rod 20.

It has been found that the embodiments of the present invention described herein may be manufactured on a large scale while maintaining both high quality and superior performance of the resultant apparatus. The apparatus is very dependable since the electrical and mechanical stresses are minimized. The rounded surfaces minimize the formation of fissures and improve the electrical field distribution.

While the principles of the invention have now been made clear in the illustrative embodiments described herein, many modifications of structure, arrangement, elements, material and components used in the practice of the present invention, which are particularly adapted for specific environments and operating requirements without departing from those principles, will be obvious to persons skilled in the art. The appended claims are, therefore, intended to cover and embrace any such modifications within the limits only of the true spirit and scope of the invention.

I claim:

1. A capacitor for use in medium voltage capacitive dividers having spaced plates encapsulated within an insulating material, said plates being free of opposing bends, protuberances, projections and the like of small radii of curvature, characterized by a combination of
   (a) a first plate comprising at least one thick, generally flat disc with rounded edges, the radius of curvature of said edges being of a magnitude sufficient to avoid the creation of dangerous electrical stresses internally of the insulating material, said first plate being connected electrically by a conducting rod to a first terminal;
   (b) a mass of solid dielectric material surrounding the first plate and a portion of the conducting rod where said rod is connected to the first plate, the outer surface of the dielectric material being substantially equidistant at all points from said first plate, said mass of solid dielectric material also forming a hollow neck constituted of at least one rounded lobe surrounding another portion of the rod, the lobe being connected to the mass of solid dielectric material surrounding the first plate by a fillet having a radius of curvature of a magnitude sufficiently large to avoid creation of a dangerous dielectric overload in the insulating material;
   (c) a second plate comprising a conducting material covering the external surface of the mass of dielectric material with the exception of the neck, said second plate being connected electrically by a conductor to a second terminal;

(d) an exterior insulating mass of a solid resin which encapsulates the mass of solid dielectric material and the second plate;

(e) said exterior insulating mass having an outer surface in which are embedded the two terminals for the two plates and a support member spaced from, and disposed generally coaxially with, one of the two terminals.

2. A capacitor in accordance with claim 1, characterized in that the second plate also covers the fillet connecting the lobe to the mass of solid dielectric material surrounding the first plate and the exterior insulating mass forms part of an electrical apparatus.

3. A capacitor in accordance with claim 1, characterized in that the second plate is constituted of an exterior deposit of metal.

4. A capacitor in accordance with claim 1, characterized in that the second plate is constituted of an exterior deposit of conducting paint.

5. A capacitor in accordance with claim 1, characterized in that the second plate is formed by casting a semiconducting material around the mass of solid dielectric material.

6. A capacitor in accordance with claim 1, characterized in that the second plate comprises two opposing cup-shaped metallic members having external edges of equal diameter, said cup-shaped members being joined to each other at their external edges to form an enclosure surrounding the first plate.

7. A capacitor in accordance with claim 1, characterized by a first plate constituted of a plurality of discs located at spaced intervals along the conducting rod and a second plate surrounding and spaced from the first plate, said second plate being configured so that all points thereof are spaced at a substantially uniform distance from the first plate.

8. A capacitor in accordance with claim 1, characterized by a first plate constituted of at least one solid aluminum disc affixed to a coaxial conducting rod.

9. A capacitor in accordance with claim 1, characterized by a first plate constituted of a disc filled with a semiconducting elastomeric material affixed to a coaxial conducting rod.

10. A capacitor in accordance with claim 1, characterized by a first plate constituting a disc composed of two opposing, substantially identical cup-shaped members of substantially identical configuration having exterior edges in contact with each other, said disc being affixed to the end of a coaxial conducting rod.

11. A capacitor in accordance with claim 1, characterized by a first plate constituting a disc composed of two substantially identical cup-shaped members having exterior edges extending internally of the disc, and a ring of semiconducting elastomeric material disposed externally of the disc, said disc being fastened to the end of a coaxial conducting rod.

12. A capacitor in accordance with claim 1, characterized by a first plate constituted by a disc composed of two substantially identical cup-shaped members having exterior edges inclined inwardly of the disc, said inwardly disposed edges of the two cup-shaped members being spaced apart, and a ring of an elastomeric material surrounding the disc and having grooves for engagement with the spaced edges of the cup-shaped members, said disc being fastened to the end of a coaxial conducting rod.

13. A capacitor in accordance with claim 1, characterized by a first plate constituted of a disc comprising a cast insulating part having exterior metallization, said disc being fastened to the end of a coaxial conducting rod and said exterior metallization being connected electrically to said rod.

14. A capacitor in accordance with claim 1, characterized by first and second plates constituted of a metal whose coefficient of expansion is substantially equal to the coefficient of expansion of the encapsulating insulating material.

15. A capacitor in accordance with claim 14, characterized in that the metal is aluminum and the insulating material is epoxy resin.

16. A capacitor in accordance with claim 1, characterized by coaxial and symmetrical plates.

17. A capacitor in accordance with claim 1, characterized by the first plate being constituted of a metal whose coefficient of expansion is substantially equal to the coefficient of expansion of the encapsulating insulating material.

18. A capacitor in accordance with claim 1, characterized by at least one of the plates being constituted of a metal whose coefficient of expansion is substantially equal to the coefficient of expansion of the encapsulating insulating material.

* * * * *

UNITED STATES PATENT OFFICE
CERTIFICATE OF CORRECTION

PATENT NO. : 4,466,047
DATED : August 14, 1984
INVENTOR(S) : Jean P. Avocat

It is certified that error appears in the above-identified patent and that said Letters Patent are hereby corrected as shown below:

Column 4

Line 65, after the <u>period</u> insert --Both plates 19 and 39, 40 may be formed of aluminum.--

Signed and Sealed this

Twenty-ninth Day of January 1985

[SEAL]

Attest:

DONALD J. QUIGG

Attesting Officer     Acting Commissioner of Patents and Trademarks